United States Patent
Divya et al.

(10) Patent No.: US 12,522,611 B2
(45) Date of Patent: Jan. 13, 2026

(54) PROCESS FOR THE PREPARATION OF HIGH PURE ERIBULIN AND ITS MESYLATE SALT

(71) Applicant: Natco Pharma Limited, Hyderabad (IN)

(72) Inventors: Prabhakar Divya, Hyderabad (IN); Srinivasu Kasa, Hyderabad (IN); Durga Prasad Konakanchi, Hyderabad (IN); Ramesh Dandala, Hyderabad (IN); Pulla Reddy Muddasani, Hyderabad (IN); Venkaiah Chowdary Nannapaneni, Hyderabad (IN)

(73) Assignee: Natco Pharma Limited, Hyderabad (IN)

( * ) Notice: Subject to any disclaimer, the term of this patent is extended or adjusted under 35 U.S.C. 154(b) by 1246 days.

(21) Appl. No.: 17/298,229

(22) PCT Filed: Nov. 27, 2019

(86) PCT No.: PCT/IN2019/050868
§ 371 (c)(1),
(2) Date: May 28, 2021

(87) PCT Pub. No.: WO2020/110146
PCT Pub. Date: Jun. 4, 2020

(65) Prior Publication Data
US 2022/0089607 A1    Mar. 24, 2022

(30) Foreign Application Priority Data
Nov. 28, 2018  (IN) .............................. 201841044877

(51) Int. Cl.
*C07D 493/22* (2006.01)
*C07C 311/19* (2006.01)

(52) U.S. Cl.
CPC .......... *C07D 493/22* (2013.01); *C07C 311/19* (2013.01)

(58) Field of Classification Search
CPC .................................................... C07D 493/22
See application file for complete search history.

(56) References Cited

U.S. PATENT DOCUMENTS

| 5,792,869 | A | * | 8/1998 | Murakami | ........... C07D 241/04 544/360 |
| 6,214,865 | B1 | * | 4/2001 | Littlefield | ............ C07D 493/22 514/432 |
| 2017/0298078 | A1 | * | 10/2017 | Hu | ........................ C07D 493/22 |
| 2018/0009825 | A1 | * | 1/2018 | Kovi | ..................... C07F 7/1804 |

FOREIGN PATENT DOCUMENTS

| WO | WO-2005/118565 | | 12/2005 | |
| WO | WO-2005118565 A1 | * | 12/2005 | .............. A61P 35/00 |
| WO | WO-2022101931 A1 | * | 5/2022 | |

OTHER PUBLICATIONS

International Search Report and Written Opinion for International Application No. PCT/IN2019/050868 mailed Jun. 4, 2020 (8 pages).

* cited by examiner

*Primary Examiner* — John S Kenyon
*Assistant Examiner* — Rehana Ismail
(74) *Attorney, Agent, or Firm* — Dickinson Wright PLLC

(57) ABSTRACT

The present invention relates to a process for the preparation of high pure Eribulin and Eribulin Mesylate. The present invention involves preparation of high pure Eribulin and its mesylate salt involving chiral acid addition salts of Eribulin.

11 Claims, No Drawings

PROCESS FOR THE PREPARATION OF HIGH PURE ERIBULIN AND ITS MESYLATE SALT

CROSS-REFERENCES TO RELATED APPLICATIONS

This application is a U.S. National Phase Application of PCT International Application No. PCT/IN2019/050868, filed Nov. 27, 2019, which is an International Application of and claims the benefit of priority to Indian Patent Application number 201841044877, filed on Nov. 28, 2018, the entire contents of which are herein incorporated by reference.

FIELD OF THE INVENTION

The present invention relates to the process for the preparation of high pure Eribulin and Eribulin Mesylate. The present invention involves less expensive reagents, solvents and the process conditions can be easily adopted for commercial scale.

BACKGROUND OF THE INVENTION

Eribulin, is a synthetic macrocyclic analogs of halichondrin B, and is represented by structural formula as shown in below.

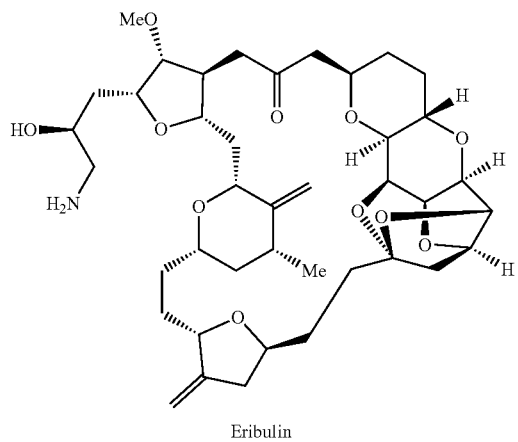

Eribulin (I)

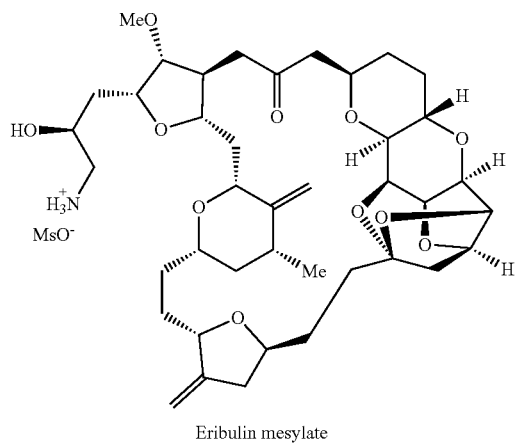

Eribulin mesylate (II)

Eribulin is marketed as Eribulin Mesylate under the brand name HALAYEN® and it is indicated for the treatment of patients with metastatic breast cancer. U.S. Pat. No. 6,214,865 discloses Eribulin.

PCT application WO 2005/118565 discloses process for the synthesis of Eribulin Mesylate. The reported process suffer from major disadvantages, including low yield, low purity and formation of Eribulin isomers which are difficult to remove using conventional purification methods.

Hence, there remains a need to provide an alternative processes for the preparation of high pure Eribulin and Eribulin Mesylate.

SUMMARY OF THE INVENTION

According to a first aspect of the present invention, the process is useful in the synthesis of Eribulin and Eribulin mesylate.

One Aspect of the present invention is to provide a process for the preparation of high pure Eribulin mesylate comprising the steps of:

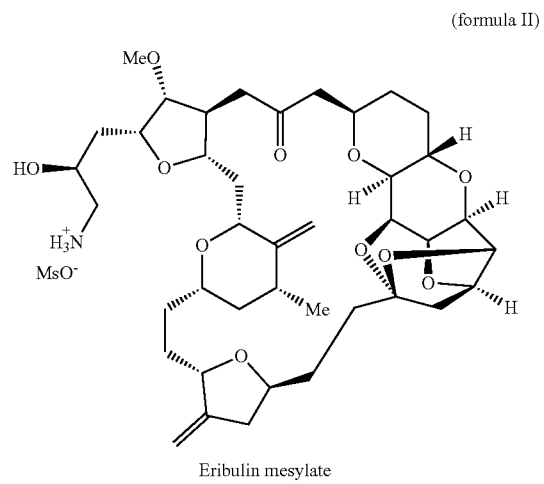 [SMILES: "MsO-" ; C=C1C[C@@H]2CC[C@@]34C[C@H]5O[C@H]6[C@@H](O3)[C@H]3O[C@H](CC[C@@H]3O[C@H]6[C@H]5O4)CC(=O)C[C@@H]3[C@@H](OC)[C@@H](C[C@H](O)CN)O[C@H]3C[C@H]3O[C@@H](CC[C@@H]1O2)C[C@@H](C)C3=C]

Eribulin mesylate (formula II)

(i) reacting Eribulin free base of formula-I,

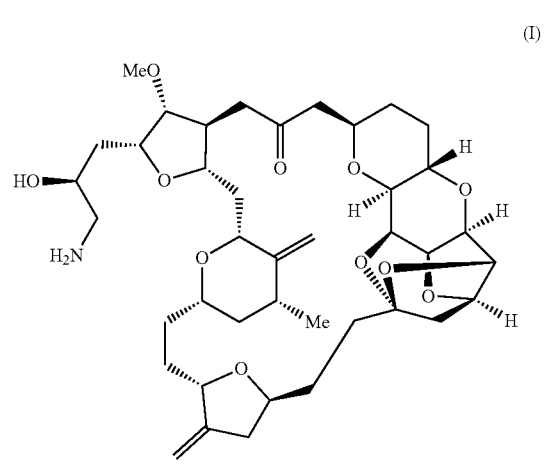 [SMILES: C=C1C[C@@H]2CC[C@@]34C[C@H]5O[C@H]6[C@@H](O3)[C@H]3O[C@H](CC[C@@H]3O[C@H]6[C@H]5O4)CC(=O)C[C@@H]3[C@@H](OC)[C@@H](C[C@H](O)CN)O[C@H]3C[C@H]3O[C@@H](CC[C@@H]1O2)C[C@@H](C)C3=C]

(I)

with a chiral acid of formula-III,

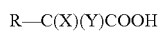

wherein
R=aryl, alkyl, aralkyl, substituted aryl, heteroaryl, substituted heteroaryl, etc.
X=H, alkyl, etc.
Y=NHZ, where Z=SO₂R', COR', where R'=aryl, alkyl, aralkyl, substituted aryl, heteroaryl, substituted heteroaryl, to form a chiral acid addition salt of formula-IV,

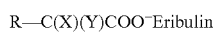

wherein R, X, and Y are as defined above.
(ii) purifying the chiral acid addition salt of formula-IV in a suitable solvent to get pure chiral acid addition salt,
(iii) neutralizing the acid addition salt of formula-IV with a base to get high pure Eribulin after extracting into a solvent and distilling of the solvent,
(iv) converting the pure Eribulin base to mesylate salt.

Another aspect of the present invention is to provide a process for the preparation of high pure Eribulin comprising the steps of:
a) reacting Eribulin free base with a protected chiral acid to form corresponding acid addition salt of Eribulin,
b) purifying the acid addition salt of Eribulin by recrystallization to control the related impurities,
c) treating the salt with a base to liberate high pure Eribulin,
d) optionally converting the high pure Eribulin to Eribulin mesylate.

Yet another aspect of the present invention is to provide a chiral acid addition salts of Eribulin.

DETAILED DESCRIPTION OF THE INVENTION

The present invention is related to a process for the preparation of high pure Eribulin and Eribulin mesylate, whereas the present process uses the chiral acid addition salt to purify the Eribulin free base and converts it to the Eribulin mesylate.

One embodiment of the present invention is to provide a process for the preparation of high pure Eribulin mesylate comprising the steps of:

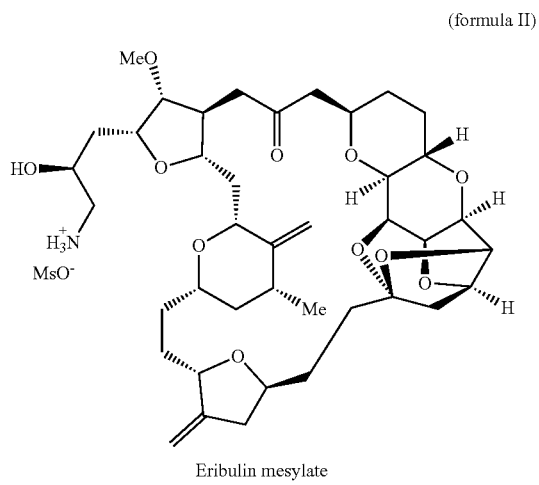 [SMILES: "MsO-" ; C=C1C[C@@H]2CC[C@@]34C[C@H]5O[C@H]6[C@@H](O3)[C@H]3O[C@H](CC[C@@H]3O[C@H]6[C@H]5O4)CC(=O)C[C@@H]3[C@@H](OC)[C@@H](C[C@H](O)CN)O[C@H]3C[C@H]3O[C@@H](CC[C@@H]1O2)C[C@@H](C)C3=C]

Eribulin mesylate (i) reacting Eribulin free base of formula-I,

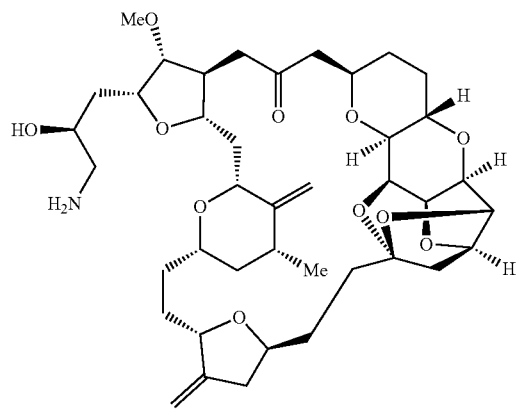

with a chiral acid of formula-III,

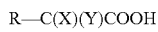

wherein
R=aryl, alkyl, aralkyl, substituted aryl, heteroaryl, substituted heteroaryl, etc.
X=H, alkyl, etc.
Y=NHZ, where Z=SO₂R', COR', where R'=aryl, alkyl, aralkyl, substituted aryl, heteroaryl, substituted heteroaryl, to form a chiral acid addition salt of formula-IV,

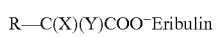

wherein R, X, and Y are as defined above.
(ii) purifying the chiral acid addition salt of formula-IV in a suitable solvent to get pure chiral acid addition salt,
(iii) neutralizing the acid addition salt of formula-IV with a base to get high pure Eribulin after extracting into a solvent and distilling of the solvent,
(iv) converting the pure Eribulin base to mesylate salt.

Another embodiment of the present invention is to provide a process for the preparation of high pure Eribulin comprising the steps of:
a) reacting Eribulin free base with a protected chiral acid to form corresponding acid addition salt of Eribulin,
b) purifying the acid addition salt of Eribulin by recrystallization to control the related impurities,
c) treating the salt with a base to liberate high pure Eribulin,
d) optionally converting the high pure Eribulin to Eribulin mesylate.

Yet another embodiment of the present invention is to provide a chiral acid addition salts of Eribulin.

According to the present invention chiral acid used in present invention is amino acid.

According to the present invention chiral acid is selected from L-phenyl alanine, L-Valine, L-methionine, L-isoleucine and L-Tyrosine.

Solvent used to recrystallize acid addition salt of Eribulin is selected from acetonitrile, dichloromethane, n-pentane, hexane.

According to the present invention the base used to liberate pure Eribulin from Eribulin chiral acid addition salt is selected from ammonia, aqueous ammonia, sodium hydroxide, ammonium hydroxide, sodium carbonate, ammonium carbonate, etc., preferably, aqueous ammonia.

According to the present invention pure Eribulin base is treated with ammonium methanesulfonate to get pure Eribulin mesylate.

According to the present invention the Eribulin base is having the purity of more than 99%.

According to the present invention the obtained Eribulin mesylate is having the purity of more than 99%, preferably more than 99.5%.

According to the present invention N-(p-Toluene sulfonyl)-L-phenylalanine is dissolved in solvent and added slowly to the Eribulin free base and stirred the reaction mass for 50-70 min at 15-35° C., after completion of the reaction filtered the solid and washed with solvent and dried under vacuum to get Eribulin N-(p-Toluene sulfonyl)-L-phenyl alanine salt. The Eribulin N-(p-Toluene sulfonyl)-L-phenyl alanine salt is dissolved in solvent and added the base at 10-20° C. and stirred the reaction mass for 15-30 minutes to get high pure Eribulin, to this high pure Eribulin added the ammonium methane sulfonate to get the Eribulin mesylate.

The invention according to above embodiments is shown in below scheme.

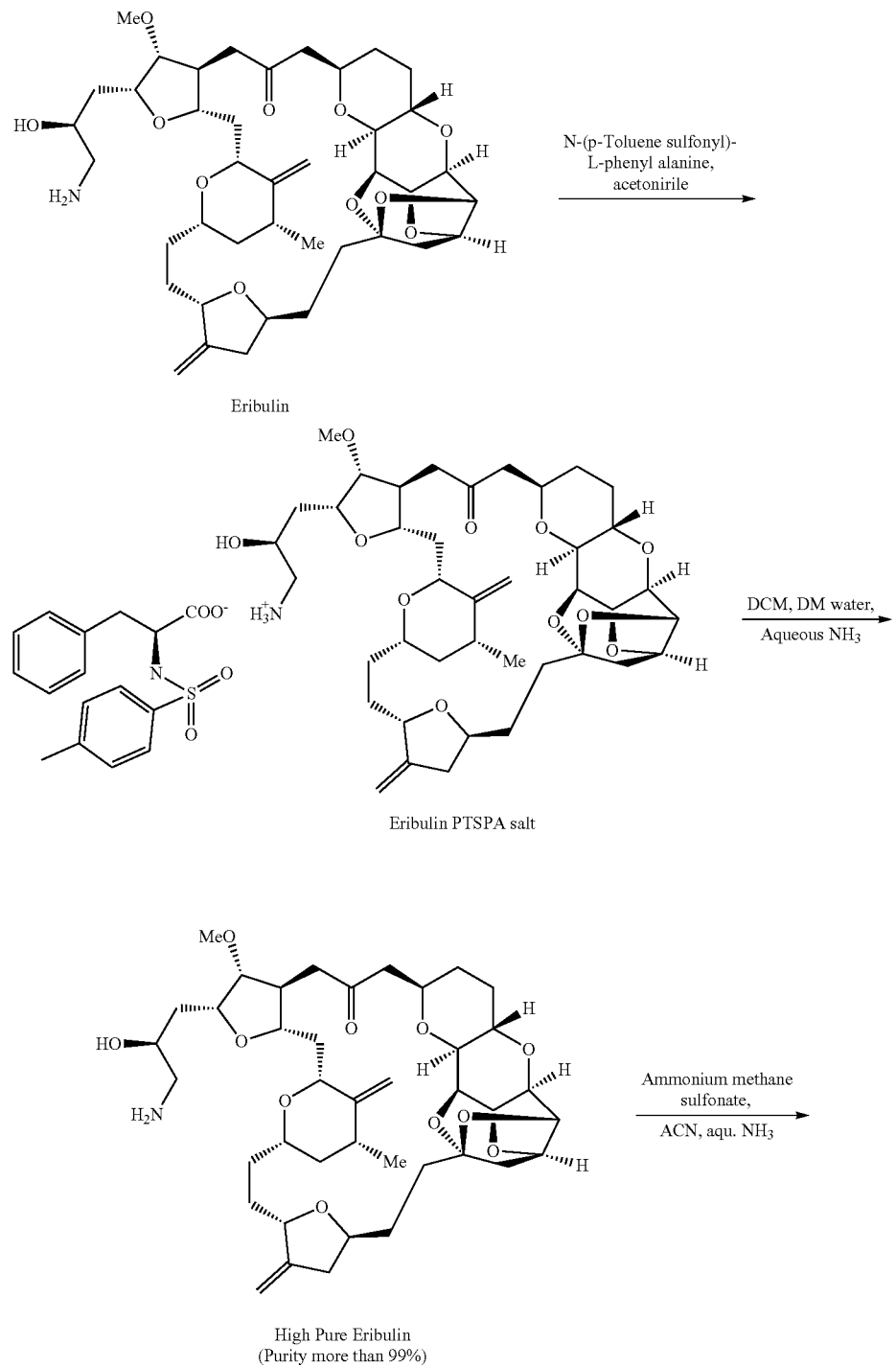

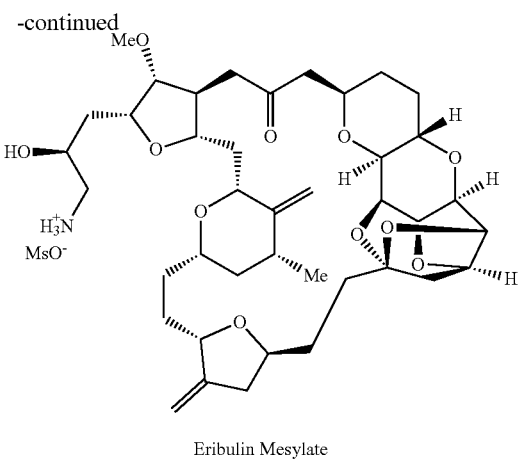

Eribulin Mesylate

According to the present invention, Eribulin used in the present invention is prepared by the prior art process.

Advantages of the Present Invention

1. Purification of impure Eribulin to pure Eribulin is achieved by simply converting it into a chiral acid addition salt.
2. Eribulin base is prepared with a purity of more than 99%.
3. Eribulin mesylate having a purity of more than 99% was achieved with the present process.
4. Several isomeric impurities of Eribulin and its precursors got eliminated by this process to less than 0.1% level.

The Present invention is further illustrated in detail with reference to following examples. It is desired that the examples be considered in all respect as illustrative and are not intended to limit the scope of the invention in any way.

EXAMPLES

Example-1: Preparation of Eribulin PTSPA Salt from Eribulin Free Base

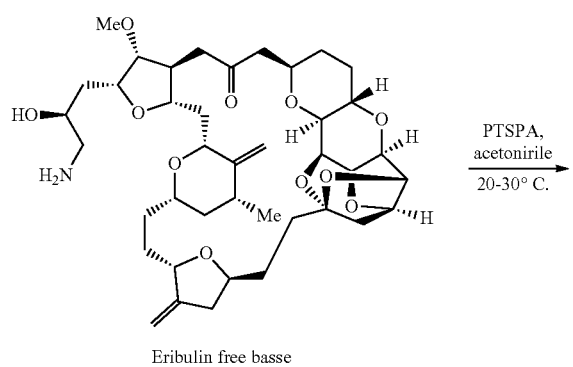

Eribulin free basse

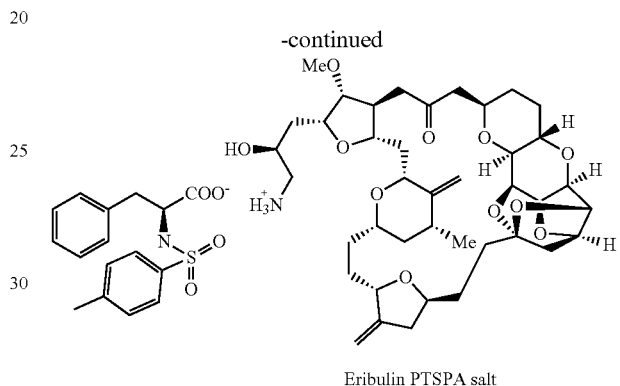

Eribulin PTSPA salt

To a stirred solution of acetonitrile (100 ml) was added Eribulin free base (2.0 g) at 20-30° C. and stirred the mass for 10-15 minutes at 20-30° C. Dissolved the N-(p-Toluene sulfonyl)-L-phenyl alanine (0.875 g) in acetonitrile (50 mL) and added slowly to the Eribulin free base solution at 20-30° C. Stirred the reaction mass for 60 minutes at 20-30° C. and filtered the solid and washed the cake with 25 ml of acetonitrile and dried under vacuum at 30-35° C. for 3 hours.

Dry weight: ~2.35 g

Yield: ~81.8%

Purity by HPLC: ~99.69%

$^1$H NMR δ 0.93-1.04, 1.157-1.31, 1.451-1.70, 1.924-2.00, 2.12-2.15, 2.21-2.36, 2.56-2.60, 2.73-2.94, 3.285-3.356, 3.484-3.529, 3.705-3.798, 4.023, 4.105, 4.167-4.176, 4.246-4.273, 4.555-4.564, 4.635, 4.755, 4.824, 4.991, 5.053, 7.122-7.172, 7.30-7.32, 7.558-7.578.

$^{13}$C NMR δ 1.17, 17.87, 20.96, 27.76, 28.98, 29.82, 30.40, 31.48, 33.66, 34.29, 35.15, 37.89, 38.14, 38.49, 43.00, 43.74, 44.43, 46.71, 47.56, 47.93, 56.38, 57.94, 65.15, 67.75, 72.55, 73.17, 73.26, 73.60, 73.79, 74.31, 74.94, 75.48, 76.72, 79.52, 80.33, 81.95, 86.66, 104.14, 104.62, 109.00, 118.11, 125.68, 126.64, 127.56, 129.45, 129.93, 137.33, 138.38, 142.36, 150.95, 152.25, 171.14, 206.53.

Example-2: Preparation of Eribulin Mesylate from Eribulin PTSPA Salt Via Eribulin Free Base (Pure)

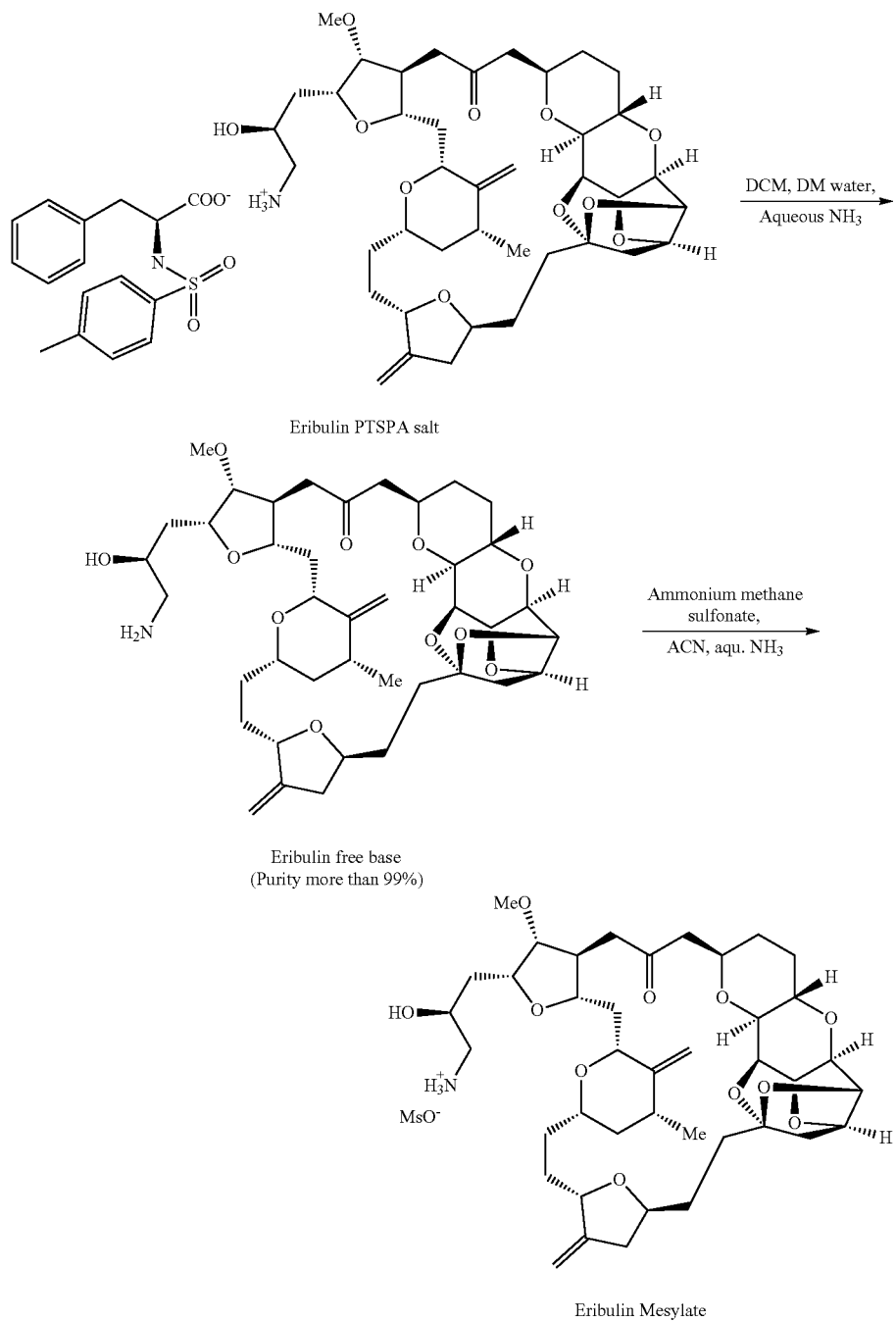

Preparation of Pure Eribulin Free Base

To a stirred Eribulin PTSPA salt (2.74 g) charged dichloromethane (300 ml) at 20-30° C. and Charged DM water (150 ml) at 20-30° C. and cooled the reaction mass to 10-15° C. and charged aqueous ammonia solution (3.0 ml) at 10-15° C. and stirred the mass for 20 minutes (pH≈9.7), separated the organic layer and aqueous layer, extracted the aqueous layer with dichloromethane (150 ml), separated the organic layer and aqueous layer, combined the organic layer and washed with DM water (150 ml), distilled the dichloromethane layer under vacuum at below 30° C. to obtain Pure Eribulin free base (1.905 g).

Purity by HPLC: ~99.068%

Preparation of Eribulin Mesylate:

To a stirred solution of pure Eribulin free base (1.9 g), charged acetonitrile (70 ml) at 20-30° C., charged aqueous ammonia solution (3 ml) at 20-30° C., charged ammonium methane sulfonate (0.3 g) with acetonitrile (10 ml). Stirred the reaction mass for 30 minutes at 20-30° C. Distilled the reaction mass at below 30° C. and obtained thick oil residue. Co-distilled the reaction mass with acetonitrile (20 ml) under vacuum at below 30° C. and obtained thick solid. Charged 75% dichloromethane in n-Pentane (40 ml) at 20-30° C. Stirred for 10 minute and filtered the solution. Distilled the filtrate under vacuum at below 30° C. and obtained solid, dissolved the above solid in 50% dichloromethane in n-pentane (40 ml) and filtered the particles, the filtrate was added slowly into n-pentane (225 ml) in another RB flask at 20-30° C. Stirred the mass for 16 hours at 20-30° C. Filtered the solid under nitrogen pressure and washed with n-pentane (50 ml), Dried the compound under vacuum at 20-30° C. for 60 minutes.

Dry weight: ~1.70 g.

The overall yield of Eribulin mesylate obtained from Eribulin PTSPA salt: ~79%

Purity by HPLC: ~99.416%

Example-3: Preparation of Eribulin NPA Salt from Eribulin Free Base

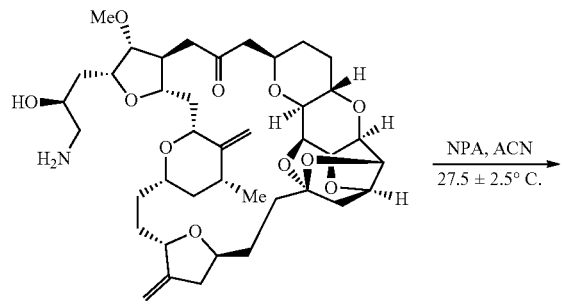

Eribulin Free base

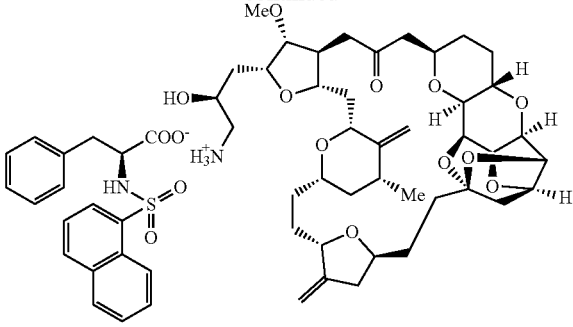

Eribulin NPA salt

To a stirred solution of acetonitrile (15 ml) was added Eribulin free base (0.3 g) at 20-30° C. and stirred the mass for 5-15 minutes at 20-30° C. Dissolved the N-(Naphthalene sulfonyl)-L-phenyl alanine (0.14 g) in acetonitrile (7.5 mL) and added slowly to the Eribulin free base solution at 20-30° C. Stirred the reaction mass for 180 minutes at 20-30° C. and filtered the solid and washed the cake with 5 ml of acetonitrile and dried under vacuum at 25-35° C. for 3 hours.

Dry weight: ~0.18 g

Purity by HPLC: ~99.69%

$^1$H NMR δ 1.0, 1.6-1.7, 2.0-2.2, 2.3-2.5, 2.9-3.0, 3.2-3.4, 4.0-4.1, 4.5, 4.7-4.8, 5.0, 7.1, 7.6-7.7, 8.0-8.1, 8.3-8.4.

$^{13}$C NMR δ 17.844, 28.971, 29.799, 33.597, 35.113, 37.871, 38.343, 38.478, 43.733, 44.426, 56.361, 58.250, 65.104, 67.729, 72.537, 73.224, 73.591, 73.767, 74.288, 74.932, 75.468, 76.736, 79.486, 108.982, 122.461, 125.666, 127.333, 127.533, 127.729, 128.494, 129.061, 129.143, 129.816, 131.636, 134.040, 137.392, 138.348, 150.927, 152.210, 206.479.

Example-4: Preparation of Eribulin Mesylate from Eribulin NPA Salt Via Eribulin Free Base (Pure)

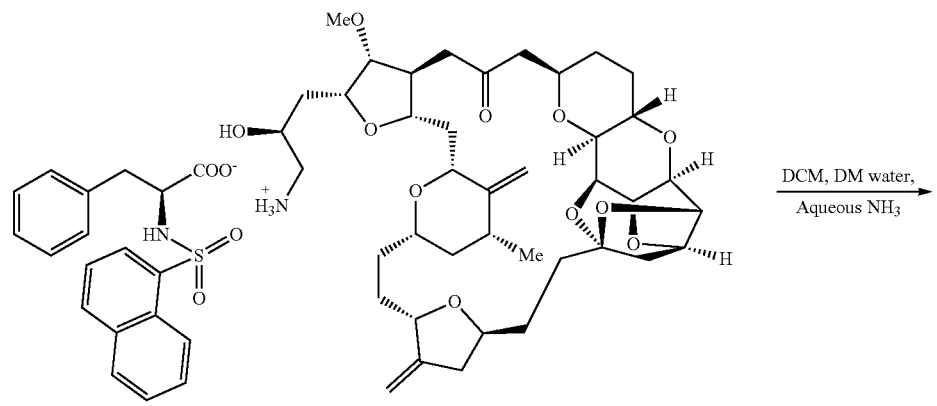

Eribulin NPA salt

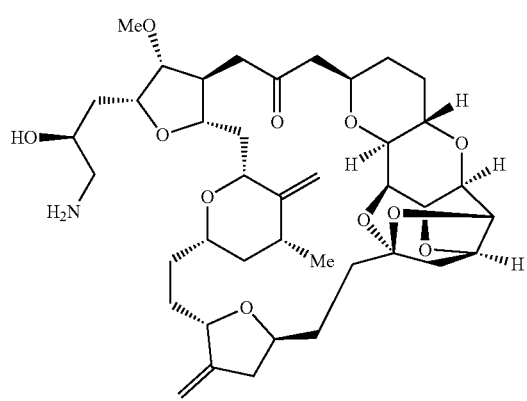

Eribulin free base
(Purity more than 99%)

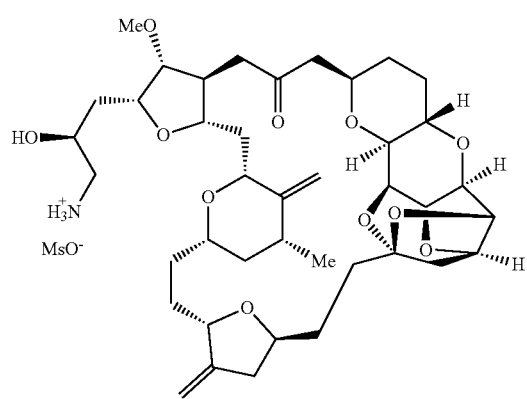

Eribulin Mesylate

Preparation of Pure Eribulin Free Base

To a stirred Eribulin NPA salt (2.8 g) charged dichloromethane (300 ml) at 20-30° C. and Charged DM water (150 ml) at 20-30° C. and cooled the reaction mass to 10-15° C. and charged aqueous ammonia solution (3.0 ml) at 10-15° C. and stirred the mass for 20 minutes (pH≈9.7), separated the organic layer and aqueous layer, extracted the aqueous layer with dichloromethane (150 ml), separated the organic layer and aqueous layer, combined the organic layer and washed with DM water (150 ml), distilled the dichloromethane layer under vacuum at below 30° C. to obtain Pure Eribulin free base (1.905 g).

Purity by HPLC: −99.068%

Preparation of Eribulin Mesylate:

To a stirred solution of pure Eribulin free base (1.9 g), charged acetonitrile (70 ml) at 20-30° C., charged aqueous ammonia solution (3 ml) at 20-30° C., charged ammonium methane sulfonate (0.3 g) with acetonitrile (10 ml). Stirred the reaction mass for 30 minutes at 20-30° C. Distilled the reaction mass at below 30° C. and obtained thick oil residue. Co-distilled the reaction mass with acetonitrile (20 ml) under vacuum at below 30° C. and obtained thick solid. Charged 75% dichloromethane in n-Pentane (40 ml) at 20-30° C. Stirred for 10 minute and filtered the solution. Distilled the filtrate under vacuum at below 30° C. and obtained solid, dissolved the above solid in 50% dichloromethane in n-pentane (40 ml) and filtered the particles, the filtrate was added slowly into n-pentane (225 ml) in another RB flask at 20-30° C. Stirred the mass for 16 hours at 20-30° C. Filtered the solid under nitrogen pressure and washed with n-pentane (50 ml), Dried the compound under vacuum at 20-30° C. for 60 minutes.

Dry weight: −1.70 g.

The overall yield of Eribulin mesylate obtained from Eribulin NPA salt: −79%

Purity by HPLC: −99.416%

Example-5: Preparation of Eribulin PPA L-Tyrosine Salt from Eribulin Free Base

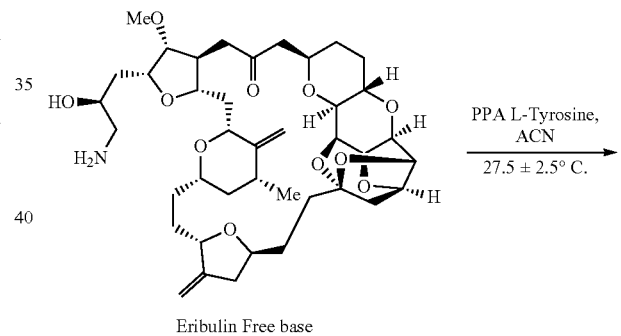

Eribulin Free base

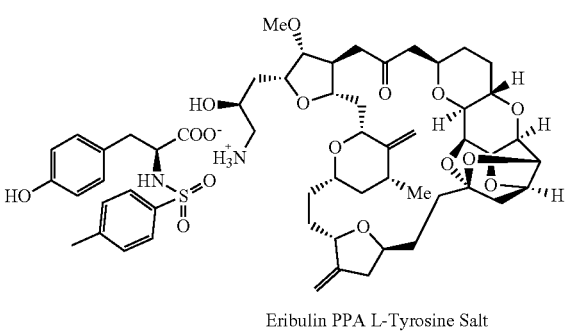

Eribulin PPA L-Tyrosine Salt

To a stirred solution of acetonitrile (15 ml) was added Eribulin free base (0.3 g) at 20-30° C. and stirred the mass for 5-15 minutes at 20-30° C. Dissolved the N-(p-Toluene sulfonyl)-L-Tyrosine (0.13 g) in acetonitrile (7.5 mL) and added slowly to the Eribulin free base solution at 20-30° C. Stirred the reaction mass for 180 minutes at 20-30° C. and filtered the solid and washed the cake with 5 ml of acetonitrile and dried under vacuum at 25-35° C. for 3 hours.
Dry weight: –0.18 g
Purity by HPLC: –99.69%
$^{1}$H NMR δ 1.0, 1.6, 1.9, 2.2, 2.3-2.4, 2.7-2.9, 3.0-3.2, 4.1, 4.7-4.8, 6.8, 7.1, 7.3, 7.4, 7.5, 7.7
$^{13}$C NMR δ 17.856, 20.946, 21.181, 27.780, 29.828, 33.588, 34.313, 35.131, 37.498, 37.902, 38.500, 56.373, 57.782, 72.559, 73.221, 73.601, 73.779, 74.317, 74.963, 75.489, 76.705, 76.847, 79.494, 80.336, 86.658, 109.002, 121.000, 126.693, 128.165, 129.485, 130.193, 131.329, 131.646, 137.067, 138.020, 142.449, 145.624, 147.262, 152.200, 170.735.
Example-6: Preparation of Eribulin Mesylate from PPA L-Tyrosine Salt Via Eribulin Free Base (Pure)
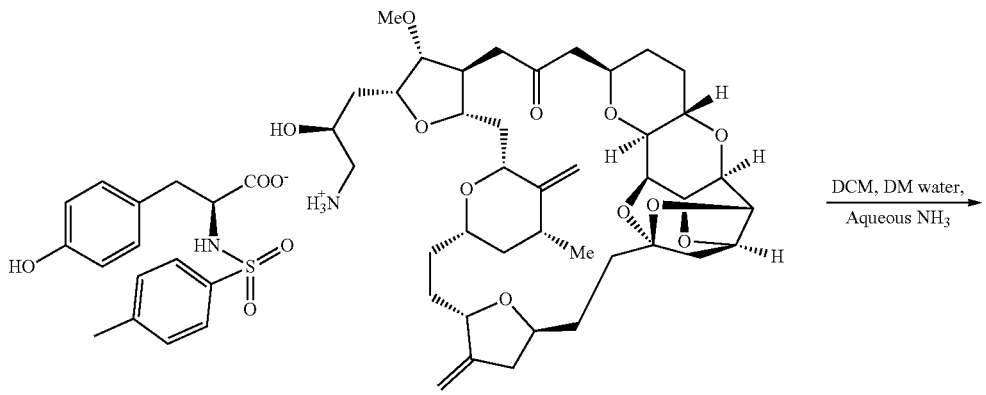
Eribulin PPA L-Tyrosine Salt
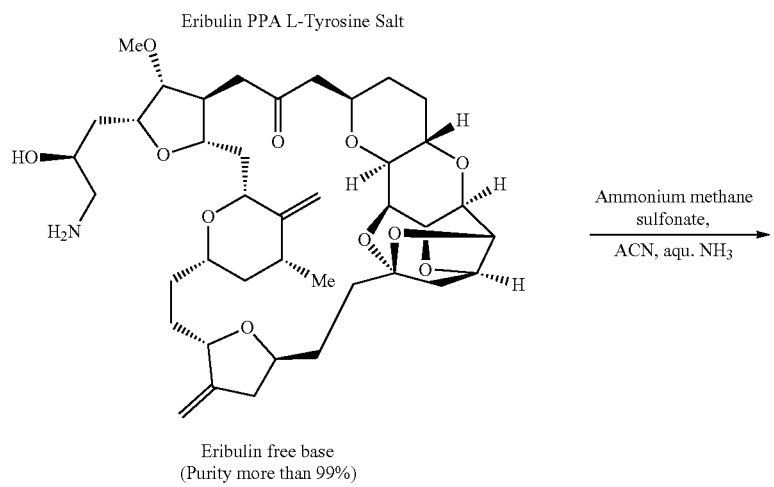
Eribulin free base
(Purity more than 99%)
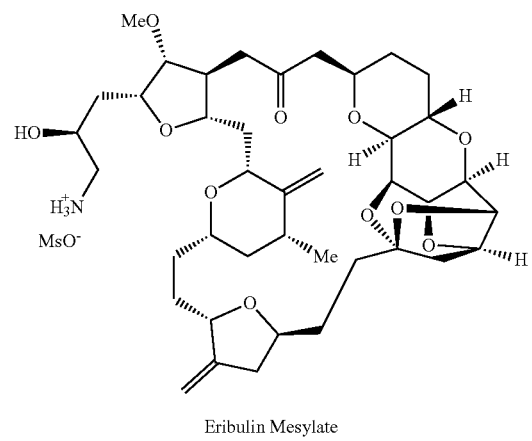
Eribulin Mesylate Preparation of Pure Eribulin Free Base To a stirred Eribulin PPA L-Tyrosine salt (2.9 g) charged dichloromethane (300 ml) at 20-30° C. and Charged DM water (150 ml) at 20-30° C. and cooled the reaction mass to 10-15° C. and charged aqueous ammonia solution (3.0 ml) at 10-15° C. and stirred the mass for 20 minutes (pH≈9.7), separated the organic layer and aqueous layer, extracted the aqueous layer with dichloromethane (150 ml), separated the organic layer and aqueous layer, combined the organic layer and washed with DM water (150 ml), distilled the dichloromethane layer under vacuum at below 30° C. to obtain Pure Eribulin free base (1.905 g).

Purity by HPLC: ~99.068%

Preparation of Eribulin Mesylate:

To a stirred solution of pure Eribulin free base (1.9 g), charged acetonitrile (70 ml) at 20-30° C., charged aqueous ammonia solution (3 ml) at 20-30° C., charged ammonium methane sulfonate (0.3 g) with acetonitrile (10 ml). Stirred the reaction mass for 30 minutes at 20-30° C. Distilled the reaction mass at below 30° C. and obtained thick oil residue. Co-distilled the reaction mass with acetonitrile (20 ml) under vacuum at below 30° C. and obtained thick solid. Charged 75% dichloromethane in n-Pentane (40 ml) at 20-30° C. Stirred for 10 minute and filtered the solution. Distilled the filtrate under vacuum at below 30° C. and obtained solid, dissolved the above solid in 50% dichloromethane in n-pentane (40 ml) and filtered the particles, the filtrate was added slowly into n-pentane (225 ml) in another RB flask at 20-30° C. Stirred the mass for 16 hours at 20-30° C. Filtered the solid under nitrogen pressure and washed with n-pentane (50 ml), Dried the compound under vacuum at 20-30° C. for 60 minutes.

Dry weight: ~1.70 g.

The overall yield of Eribulin mesylate obtained from Eribulin PPA L-Tyrosine salt: ~80%

Purity by HPLC: ~99.316%

We claim:

1. A process for the preparation of high purity Eribulin mesylate (formula II):

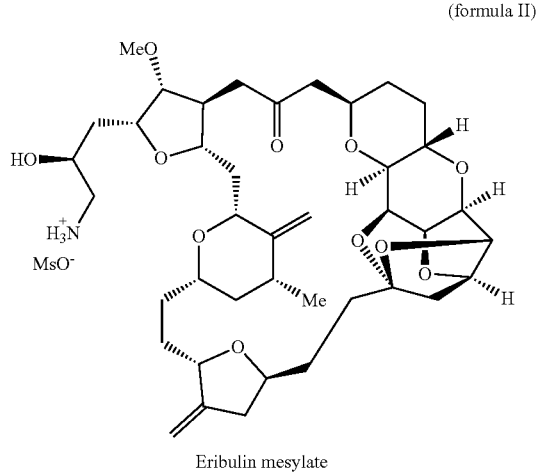 [SMILES: "MsO-" ; C=C1C[C@@H]2CC[C@@]34C[C@H]5O[C@H]6[C@@H](O3)[C@H]3O[C@H](CC[C@@H]3O[C@H]6[C@H]5O4)CC(=O)C[C@@H]3[C@@H](OC)[C@@H](C[C@H](O)CN)O[C@H]3C[C@H]3O[C@@H](CC[C@@H]1O2)C[C@@H](C)C3=C]

(formula II)

Eribulin mesylate comprising the steps of:
a) reacting Eribulin free base with a protected chiral acid to form the corresponding acid addition salt of Eribulin,
b) purifying the acid addition salt of Eribulin by recrystallization to control the related impurities,
c) treating the salt with a base to liberate high purity Eribulin, and
d) treating high purity Eribulin base with ammonium methanesulfonate to produce high purity Eribulin mesylate.

2. The process of claim 1, wherein the process comprises the steps of:
a) reacting Eribulin free base (formula-I) with a chiral acid of formula-III to form a chiral acid addition salt of formula-IV:

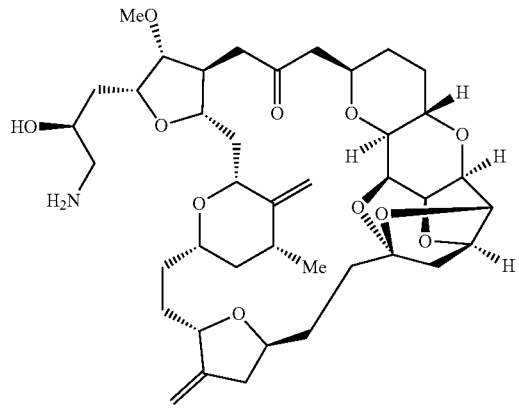

(formula I)

R—C(X)(Y)COOH    (formula III)

wherein
R=aryl, alkyl, aralkyl, substituted aryl, heteroaryl or substituted heteroaryl,
X=H or alkyl,
Y=NHZ, where Z=SO$_2$R' or COR', where R'=aryl, alkyl, aralkyl, substituted aryl, heteroaryl or substituted heteroaryl, R—C(X)(Y)COO⁻Eribulin    (formula IV)

wherein R, X, and Y are as defined above,
b) purifying the chiral acid addition salt of formula-IV in a suitable solvent to get pure chiral acid addition salt,
c) neutralizing the acid addition salt of formula-IV with a base to get high purity Eribulin after extracting into a solvent and distilling of the solvent, and
d) converting the pure Eribulin base to mesylate salt.

3. The process as claimed in claim 1, wherein the chiral acid is an amino acid.

4. The process according to claim 3, wherein the amino acid is selected from L-phenyl alanine, L-Valine, L-methionine, L-isoleucine and L-Tyrosine.

5. The process as claimed in claim 1, wherein the solvent used to recrystallize the acid addition salt of Eribulin is selected from acetonitrile, dichloromethane, n-pentane and hexane.

6. The process as claimed in claim 1, wherein the base used to liberate pure Eribulin from the Eribulin chiral acid addition salt is selected from ammonia, aqueous ammonia, sodium hydroxide, ammonium hydroxide, sodium carbonate, ammonium carbonate.

7. The process as claimed in claim 2, wherein the chiral acid is an amino acid.

8. The process according to claim 7, wherein the amino acid is selected from L-phenyl alanine, L-Valine, L-methionine, L-isoleucine and L-Tyrosine.

9. The process as claimed in claim 2, wherein the solvent used to recrystallize the acid addition salt of Eribulin is selected from acetonitrile, dichloromethane, n-pentane and hexane.

10. The process as claimed in claim 2, wherein the base used to liberate pure Eribulin from the Eribulin chiral acid addition salt is selected from ammonia, aqueous ammonia, sodium hydroxide, ammonium hydroxide, sodium carbonate, ammonium carbonate.

11. Eribulin mesylate obtained by the process of claim 1, having a purity of more than 99%, preferably more than 99.5%.

* * * * *